US007010026B1

(12) United States Patent
Hjartarson et al.

(10) Patent No.: US 7,010,026 B1
(45) Date of Patent: Mar. 7, 2006

(54) ENHANCED LINE CARD AND PACKETIZING CPE FOR LIFELINE PACKET VOICE TELEPHONE

(75) Inventors: Gudmundur Jim Hjartarson, Nepean (CA); Jonathan Boocock, Woodlawn (CA); Andrew Deczky, Ottawa (CA); Andreas Weirich, Stittsville (CA); Mark Feeley, Kanata (CA)

(73) Assignee: Ciena Corporation, Linthicum, MD (US)

( * ) Notice: Subject to any disclaimer, the term of this patent is extended or adjusted under 35 U.S.C. 154(b) by 821 days.

(21) Appl. No.: 09/652,388

(22) Filed: Aug. 31, 2000

(30) Foreign Application Priority Data

Sep. 1, 1999 (CA) .................................. 2281356

(51) Int. Cl.
*H04B 1/38* (2006.01)
*H04L 5/16* (2006.01)

(52) U.S. Cl. ...................... 375/220; 375/221; 375/222; 370/493; 370/494

(58) Field of Classification Search ............... 375/222, 375/219, 220; 370/480, 493, 494, 495, 352–356, 370/904–905, 345.52; 379/200.01, 201
See application file for complete search history.

(56) References Cited

U.S. PATENT DOCUMENTS

| 5,541,917 | A | * | 7/1996 | Farris ......................... 370/352 |
|---|---|---|---|---|
| 5,610,922 | A | | 3/1997 | Balatoni |
| 5,815,505 | A | | 9/1998 | Mills |
| 5,883,941 | A | * | 3/1999 | Akers ....................... 379/93.08 |
| 5,889,856 | A | * | 3/1999 | O'Toole et al. ........ 379/399.02 |
| 5,943,404 | A | | 8/1999 | Sansom et al. |
| 5,970,473 | A | * | 10/1999 | Gerszberg et al. ............ 705/26 |
| 5,991,311 | A | | 11/1999 | Long et al. |
| 6,430,195 | B1 | * | 8/2002 | Christie et al. ............. 370/465 |
| 6,438,124 | B1 | * | 8/2002 | Wilkes et al. ............... 370/352 |
| 6,535,505 | B1 | * | 3/2003 | Hwang et al. ............... 370/352 |
| 6,546,016 | B1 | * | 4/2003 | Gerszberg et al. .......... 370/401 |
| 6,614,781 | B1 | * | 9/2003 | Elliott et al. ................ 370/352 |
| 2002/0027876 | A1 | * | 3/2002 | Barzegar et al. ............ 370/216 |

FOREIGN PATENT DOCUMENTS

| EP | 0844 802 A2 | 5/1998 |
|---|---|---|
| EP | 930 800 A2 | 7/1999 |
| GB | 2 313 979 A | 12/1997 |
| WO | WO97/50230 A2 | 12/1997 |

* cited by examiner

*Primary Examiner*—Jean Corrielus
*Assistant Examiner*—Qutub Ghulamali
(74) *Attorney, Agent, or Firm*—Merek, Blackmon & Voorhees, LLC (57) ABSTRACT

A voice and data communication system whereby a line card digitizes and packetizes voice communications signals upon the failure of Customer Premises Equipment (CPE). The system comprises a line card for coupling the CPE with a network. Furthermore, the invention provides a system that can direct the voice signals to either or both of a voice network and a data network.

46 Claims, 3 Drawing Sheets

ENHANCED LINE CARD AND PACKETIZING CPE FOR LIFELINE PACKET VOICE TELEPHONE

CROSS-REFERENCES TO RELATED APPLICATIONS

This application claims priority from Canadian Patent Application Serial Number 2,281,356, filed Sep. 1, 1999.

BACKGROUND OF THE INVENTION

The present invention relates generally to the field of Digital Subscriber Line (DSL) systems, and particularly to packetized voice access systems.

Conventionally, telephone service is provided by the Public Switched Telephone Network (PSTN), which consists of a multiplicity of telephone switches interconnected by various transport media and formats (the PSTN transport network), and connected to telephone terminals at subscriber's premises by twisted pair loop wires.

Figure 1:
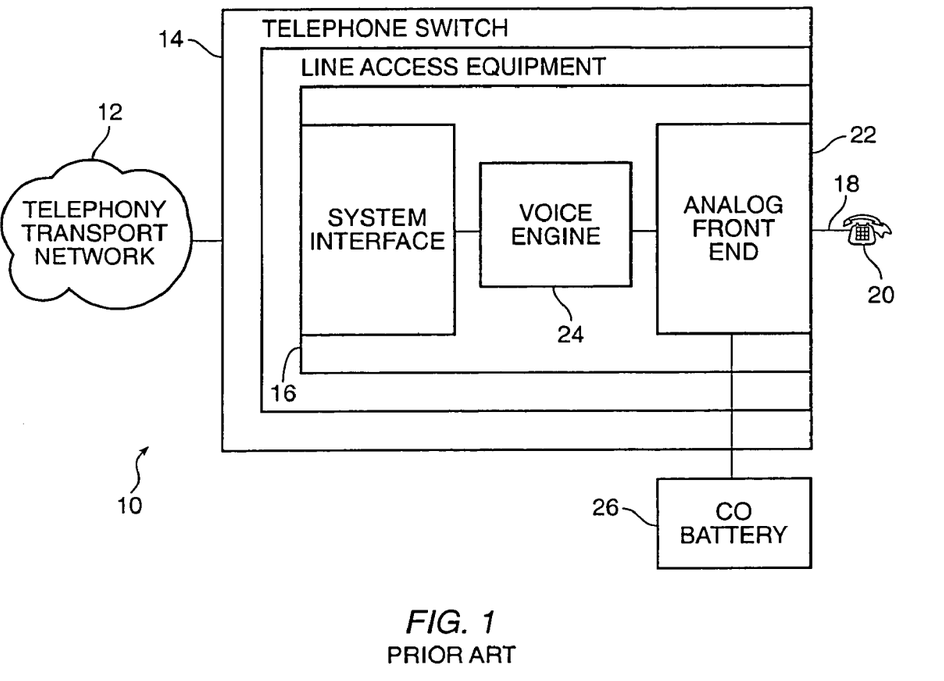
FIG. 1 is a block diagram of a conventional circuit switched telephone network interface.

FIG. 1 illustrates a conventional circuit switched telephone network, represented generally by the numeral 10. In this example, the PSTN transport network 12 interconnects telephone switches 14. The switches, in turn, interface by means of POTS line cards 16 to individual twisted pair loops 18 and telephone terminals 20. In the case of typical residential telephone service, the POTS line card 16 provides a number of functions required to operate a telephone terminal 20 connected at the subscriber's residence. These functions are often collectively referred to as BORSCHT and usually include, but are not limited to:

Battery—supplying power;
Overvoltage—protecting the line card against environmentally caused overvoltages;
Ringing—supplying a signal which energizes the telephone terminal receiver;
Supervision—detecting whether a subscriber telephone receiver is on hook or off hook;
Coding—converting the analog loop signal into digital representation;
Hybrid—separating the received from the transmitted signals; and
Termination—terminating the loop with a required standard electrical impedance at the line card.

Although implementation details differ, the B, O, R, S, and T functions typically reside in the Analog Front End 22 and the C, H, and T functions in the Voice Engine 24. The line card 16 supplies power to the telephone terminal 20 from an uninterruptible power supply 26. The power supply 26 is physically situated in the telephone central office and is referred to as the Central Office (CO) Battery. The CO Battery plant is engineered and sized to supply power to conventional telephone terminals 20 even in the event of a general power outage. Therefore, telephone service is characterized by a high degree of availability, a grade of service referred to as "lifeline" POTS. Typically, a line card 16 is capable of supplying up to 30 mA of current at 48 V to a twisted pair loop 18 and telephone 20. However, the exact value of current depends on the combined electrical resistance of the twisted pair loop 18 and the telephone terminal 20. The exact current limit value is implementation dependent and may range from 20 to 35 mA.

With the explosive growth in data communications, a Multi Service Data Network (MSDN) has evolved which now has more aggregate bandwidth and is growing more rapidly than the PSTN transport network. Data communications networks are developing that more easily support protocols and network elements which enable the routing and switching of self-contained collections of bits known as packets or cells. Essentially, each packet/cell can be independently routed or switched by devices known as routers to different destinations based on a destination address contained within each packet or cell. This is known as packet switched networking. If a packet stream contains digital representations of a voice conversation, routing of these packets represents a function analogous to conventional circuit switched telephony switching. It should be noted that the term voice is used generically and its definition may be extended to include other analog transmissions such as fax, conventional modems, and the like. In the following descriptions, packets and cells are understood to be analogous entities and, unless specifically indicated, may be used interchangeably and individually without restricting the generality of the description. The terms VoIP (Voice over IP) and VoATM (Voice over ATM) are to be treated in a similar fashion.

Figure 2:
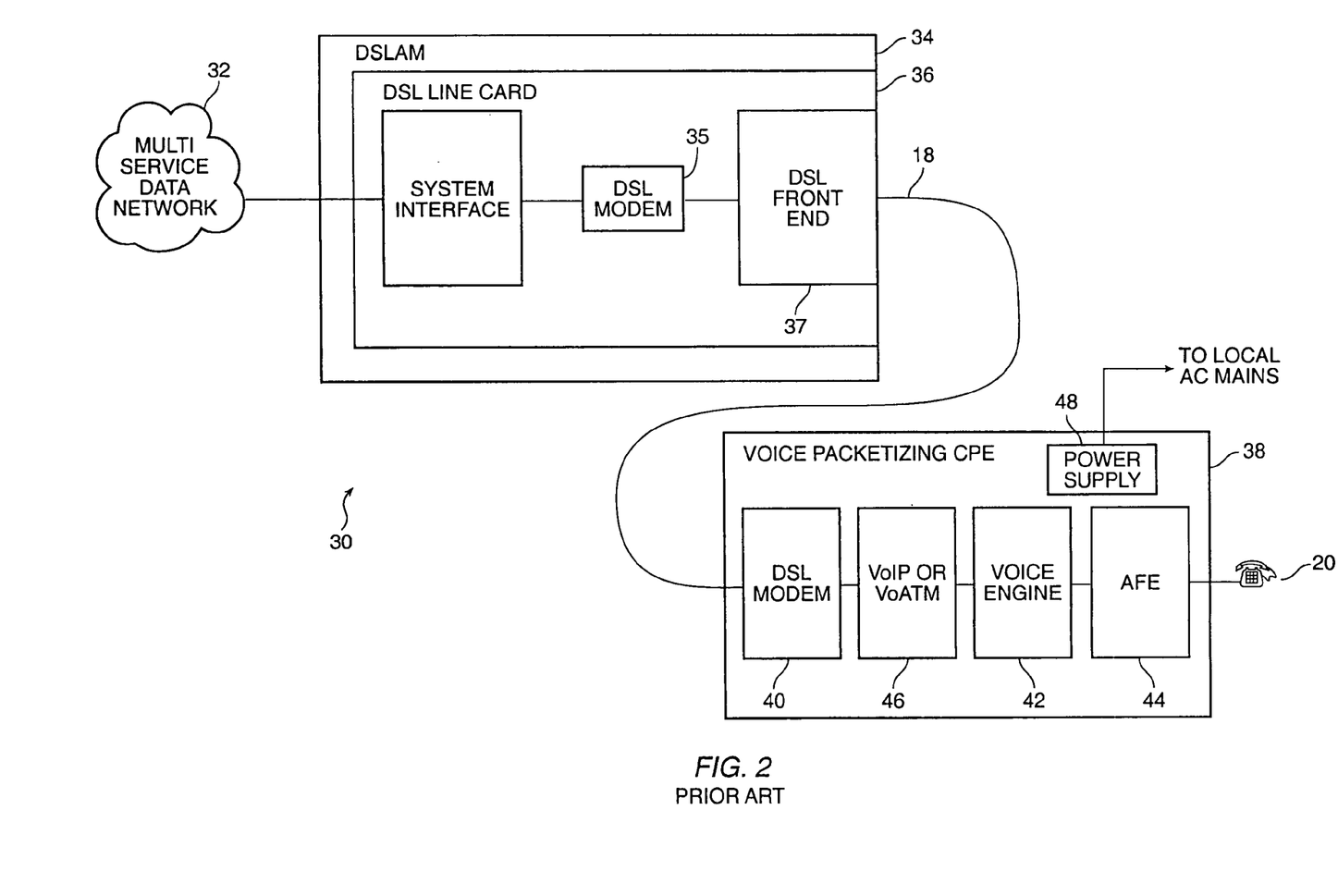
FIG. 2 is a block diagram of a conventional packetized voice access system.

FIG. 2 represents a network configuration for interconnection of a MSDN to a conventional telephone by means of voice packetization technology, namely, a Packet Switched Voice Access Network 30. The Multi Service Data Network 32 interconnects and routes packets/cells among various Digital Subscriber Loop Access Multiplexers (DSLAMs) 34, which multiplex data streams from multiple DSL Line Cards 36. Each DSL line card 36 interfaces to and communicates over a twisted pair loop 18 to DSL Customer Premises Equipment (CPE). The DSL CPE may be self contained and connected to a source of packet/cell data such as a computer (not shown), may be a DSL Network Interface Card (DSL NIC) (not shown) internal to a computer, or may be a CPE herein called a Voice Packetizing CPE 38. The DSL line card 36 may communicate using any of a number of methods that impress a signal representing a digital bit stream onto twisted pair loops 18 more conventionally used to carry POTS signals. These methods include, but are not limited to, the methods or services generally known as ADSL (Asymmetric DSL), SDSL (Symmetric DSL), HDSL (High-rate DSL), VDSL (Very high-rate DSL), ISDN (Integrated Services Digital Network), MVL (Multiple Virtual Lines), or CAP (Carrierless Amplitude/Phase).

The Voice Packetizing CPE 38 transforms the analog signals from a conventional telephone terminal 20 into voice packets or cells suitable to be carried in a DSL signal on the twisted pair loop 18 from the subscriber's premises. In order to operate a conventional telephone terminal 20, the Voice Packetizing CPE 38 includes most of the functions associated with a conventional telephone switch POTS line card 16 in its Voice Engine 42 and Analog Front End 44. Some specific differences from the corresponding POTS line card blocks might include coding to a 16 bit linear digital representation rather than Claw or A-law, the provision of 24 V rather than 48 V powering of the telephone terminal, reduced robustness to line overvoltages, and the like. The differences do not impact on the nature or significance of functions described below. A Voice over Internet Protocol (VoIP) or Voice over Asynchronous Transfer Mode (VoATM) Engine 46 may include circuits and algorithms for reducing the bit rate of the digitized voice stream received from the Voice Engine 42. The VoIP/VoATM Engine 46 also processes the reduced bit rate stream into packets or cells and may also include an echo cancellation capability for reducing the subjective audible effects of the delay introduced by the coding and packetizing operations. These functions typically implement a set of protocols which may include an embodiment of ITU Recommendation H.323, G.168 or similar standards and algorithms. The packet/cell stream generated by the VoIP/VoATM Engine 46 is transmitted to and received from the DSLAM 34 by means of the DSL modem 40. The DSL modem 40 may implement any of a variety of digital subscriber loop standards, such as ITU Recommendation G.992.1 ("Full rate ADSL") or G.992.2 ("ADSL lite").

Because the circuits contained within the Voice Packetizing CPE 38 require more power than can typically be provided by a Line Card 36, they are typically powered by means of a power supply 48 which derives its power from the local AC mains. If a local power outage disrupts AC mains power, communication using the Voice Packetizing CPE is not possible until AC mains power is restored. This is problematic for subscribers accustomed to telephone service being available despite power outages, and especially in case of a life or security threatening emergency situation. Uninterruptible AC power supplies (UPS) are commercially available which will provide AC power for a short time in the event of a local AC mains power outage. However, the disadvantages of local UPSs are the purchase cost, the limited time these devices can supply power, and the regular maintenance that is required to ensure they are operational in the event of a power outage.

Further, in conventional packet based networks, provision of lifeline packet voice service requires up to 3 separate pieces of equipment: a DSLAM, POTS Access Equipment such as a Digital Loop Concentrator, and a Gateway. The Gateway is an item of network equipment that provides a translation and mediation of voice and signaling signals and protocols between the PSTN and the MSDN. The need for three separate pieces of equipment increases overall network and equipment complexity and complicates service provisioning and maintenance.

What is needed is a mechanism to obviate or mitigate at least some of the above disadvantages.

SUMMARY OF THE INVENTION

According to the invention, a voice and data communication system is provided whereby a line card digitizes and packetizes voice communications signals even upon the failure of Customer Premises Equipment (CPE). The system comprises a line card for coupling the CPE with a network which line card includes:
- an analog front end for coupling the line card to the CPE;
- a digitizer for digitizing the received voice signals;
- a packetizer for packetizing the digitized voice signals;
- a modem for transmitting the packets; and
- a system interface for coupling the line card to at least one network.

Furthermore, the invention provides a system that can direct the voice signals to either or both of a voice network (e.g. the PSTN) and a data network (e.g. the MSDN). The system comprises a line card including:
- an analog front end for coupling the line card to a telephone;
- a digitizer for digitizing the received voice signals;
- a packetizer for packetizing the digitized voice signals;
- a modem for transmitting the digitized voice signals to the data network;
- a system interface for coupling the line card to the voice network and the data network; and
- a controller for controlling the destination of the voice signal.

The invention will be better understood by reference to the following description of specific embodiment and accompanying drawings.

DESCRIPTION OF SPECIFIC EMBODIMENTS

For convenience, like structures in the drawing are referred to using like numerals.

Figure 3:
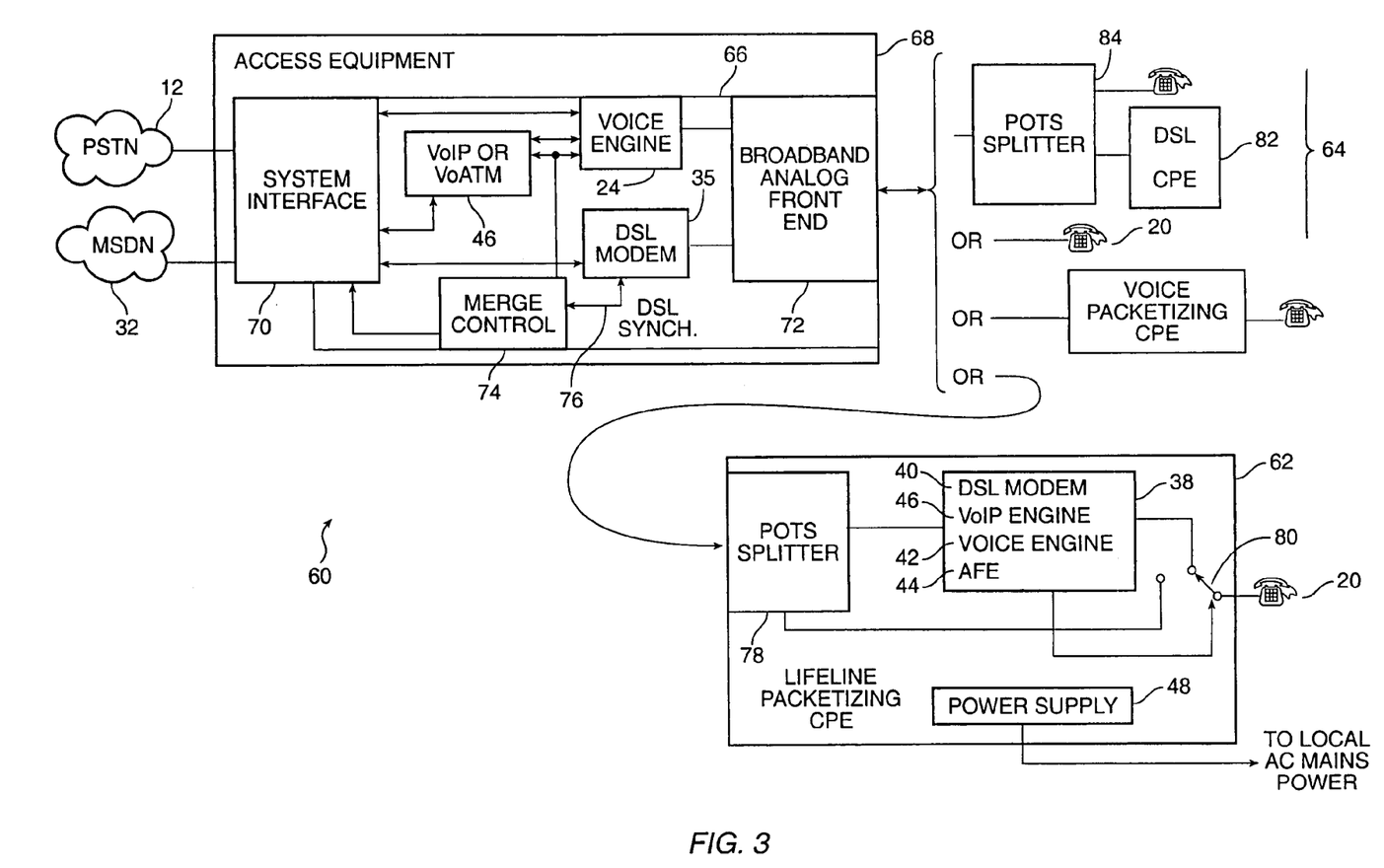
FIG. 3 is a block diagram of a lifeline packetized voice access system according to the invention.

FIG. 3 illustrates a Lifeline Packetized Voice Access system according to the invention which is represented generally by the numeral 60. The system 60 enables a lifeline grade of service to be offered for packetized voice telephony using either a Lifeline Packetizing Voice (LPV) CPE 62, as described below, or a conventional analog telephone terminal 20.

The LPV CPE 62 contains functional blocks comprising a conventional voice packetizing CPE 38 as previously described and illustrated in FIG. 2. Specifically, it comprises a DSL modem 40, VoIP or VoATM Engine 46, Voice Engine 42, and an Analog Front End 44, as well as the Power Supply 48. Additionally, the LPV CPE contains an optional POTS splitter 78, enabling a telephone terminal 20 to be connected to the twisted pair 18 through a relay 80. The common contacts of the relay 80 are connected to the telephone terminal 20, and the normally closed contacts are connected to the POTS Splitter 78. The relay is energized by a DSL Synch Detect signal 76 from the DSL modem within the voice packetizing CPE 40.

Under normal conditions, that is when the AC mains power to the Lifeline Packetizing CPE is present and the DSL modem is synchronized to a valid DSL signal on the twisted pair loop, the DSL Synch Detect signal is asserted and energizes the relay 80. When the relay 80 is energized, the common contacts are connected to the relay's normally open contacts. Therefore, the telephone terminal 20 is connected to the voice packetizing CPE 38, causing voice communications to occur by means of a digital packet/cell stream over a DSL signal through the DSL Modem 35 of the LPV Line Card 66, and to the MSDN 32.

If, however, local power to the Lifeline Packetizing CPE 62 should fail, or the DSL Modem 40 component of the voice packetizing CPE 38 does not detect a valid DSL signal, the DSL Synch Detect signal 75 is negated and de-energizes the relay 80. Therefore, the telephone terminal 20 connects through the normally closed contacts of the relay 80 and the POTS Splitter 78 to the twisted pair loop 18. In this state, the telephone terminal is directly connected to the twisted pair (through the POTS splitter 78) and powered from the CO battery through a Broadband Analog Front End (BAFE) 72 on a Lifeline Packet Voice Line Card (LPVLC) 68. Voice communication takes place through a Voice Engine 24 and a VoIP/VoATM Engine 46 on the line card 68, in a packetizing voice line card fashion.

A number of Lifeline Packet Voice Line Cards (LPVLC) 66 are contained within appropriate access equipment 68. The equipment 68 could be a Digital Loop Carrier system, a voice-capable DSLAM, a data-capable digital telephony switch, or the like.

The Lifeline Packet Voice Line Card 66 contains circuitry for interfacing to both an analog telephone terminal and a DSL-based CPE. A system interface 70 contains circuitry to interface both to the Public Switched Telephone Network (PSTN) 12 and the Multi Service Data Network (MSDN) 32. The interfaces described here are conceptually identical to their respective interfaces shown in FIG. 1 and FIG. 2. The Voice Engine 24 and DSL Modem 35 may of the type illustrated in the respective blocks in FIG. 1 and FIG. 2. The Broadband Analog Front End 72 combines the functionality of the voice only Analog Front End 22 of the POTS Line Card in FIG. 1 and the DSL Front End 37 of the DSL Line Card in FIG. 2. The Broadband Front End 72 provides the B, O, R, S, and T functions over the full bandwidth required to support both voice and DSL signals, and it satisfies the distinct requirements of both DSL and POTS interface types with regard to termination impedance, drive levels, linearity, and loop powering.

The VoIP or VoATM Engine 46 performs the function of the type previously described and depicted in the Voice Packetizing CPE 38 of FIG. 2. The Engine 46 takes the digitized voice from the voice engine 24, performs compression, packetization, and, optionally, echo cancellation. The resulting voice packets are sent to the system interface 70, where they may be merged with the packet/cell stream from the DSL modem block 35. This merging function may be implemented in the LPVLC or elsewhere in the Access Equipment 68. The merging is controlled by the merge controller 74, which produces a merge signal. The merge signal 75 is sent to the Voice Engine 24, the VoIP Engine 46, and the System Interface 70 blocks. The merge controller 74 may be configured to operate in several modes described as follows. If the merge control signal 75 is continuously asserted, the system is in Packetizing Voice mode, and the line card 66 will packetize the voice signals and direct the resulting packet stream to the MSDN, while powering a conventional telephone terminal 20. If the merge control signal 75 is continuously negated, the system is in POTS only or Packetizing CPE only mode and the line card 66 will not packetize the voice signals. However, the merge control signal 75 may also be responsive to a DSL Synch Detect signal 76 produced by the DSL Modem 35 whenever a valid DSL signal originating from the subscriber CPE is detected. This mode is referred to as Lifeline Packetizing CPE mode. According to the invention, when the CPE is not fully functional, perhaps due to a mains power outage, the line card packetizes the voice signals and directs the resulting packet stream to the MSDN, while powering a conventional telephone terminal.

The Lifeline Packet Voice Line Card 66 of the invention is therefore capable of performing the function of a conventional POTS line card as shown in FIG. 1, or of a DSL line card as shown in FIG. 2. When operating as a DSL line card 36, the Lifeline Packet Voice Line Card 66 may be part of a conventionally defined VoIP or VoATM system, where the voice packetization is performed at the CPE. The access equipment 68 in such a system does not process or alter the content of the packets or cells in the VoIP or VoATM stream but merely provides an appropriate transport for the VoIP or VoATM stream from the subscriber to the MSDN 32.

The Lifeline Packet Voice Line Card 66 is also capable of operating as a packetizing voice line card. In this mode, the LPV Line Card 66 provides an interface for a conventional telephone terminal 20, through the BAFE 72 and the Voice Engine 24. Therefore, if the power has failed at a subscriber premises, the telephone terminal is powered conventionally through the BAFE 72 from the Central Office (CO) battery (not shown) and can still transmit a voice signal to the line card 66. The Voice Engine 24 on the line card 66 digitizes the voice signal which is then packetized by the VoIP/VoATM Engine 46. The resulting packet/cell stream is delivered through the system interface 70 to the MSDN 32. Since the telephone terminal is powered from the CO, and the voice signal is delivered as a packet/cell stream to the MSDN 32, the net result is a packet voice communications capability with a lifeline grade of service.

To this point, the system has only been described as if powering and communicating with a telephone terminal and voice packetization are necessarily a function mutually exclusive with DSL communication. However, the system definition may also be extended to provide DSL communication on the same loop and simultaneous with a POTS interface. Simultaneous DSL and POTS capability on a single loop is defined in the ITU Recommendations for ADSL, for example, but is not necessarily possible for any other type of DSL modem or modulation scheme.

Referring once again to FIG. 3, a telephone terminal 20 and DSL modem 82 both communicate on the same loop 18 to the access equipment 68 through a POTS splitter 84. In some circumstances the splitter 84 may be optional. Typically, data from the DSL CPE 82 and voice signals from the telephone 20 would communicate on the same loop 18. The signals are filtered by the BAFE 72 after which the voice signal is directed via the Voice Engine 24 and system interface 70 to the PSTN 12. The data signal is directed to and demodulated by the DSL modem 35 and the resulting data packet/cell stream is directed via the system interface 70 to the MSDN 32. Both voice and data processing are, therefore, simultaneously possible on a single line card.

Alternatively, once the Voice Engine 24 has digitized the voice signal, the VoIP/VoATM Engine 46 may be used to packetize the digitized voice signal and the system interface 70 may merge the voice packets with the data packets from the DSL modem 35. The merged packet stream would be sent over the MSDN. In order to provide simultaneous Lifeline Packet Voice and data communications capability over the DSL to the MSDN, the system interface 70 includes a packet or cell multiplexing capability. The multiplexer enables the merging of the voice packet or cell stream from the VoIP/VoATM Engine 46 with the packet or cell stream from the DSL Modem 35. As previously mentioned, the merging function may be implemented in the LPVLC or elsewhere in the Access Equipment 68. The multiplexer also enables the diverging of the voice packet or cell stream from the MSDN so that the appropriate streams are sent to the VoIP/VoATM Engine 46 and DSL Modem 35 respectively.

Therefore it can be seen that the Lifeline Packet Voice Line Card 66 has the capability to direct the output of the Voice Engine 24 to either the PSTN 12 or, via the VoIP/VoATM Engine 46, to the MSDN 32, or simultaneously to both. The decision as to where to direct the voice packet stream can be made on a call-to-call basis. The capability to redirect the call exists at any time and for numerous reasons, for example during a power failure or a network connectivity failure. The line card 66, therefore, has the capability to rapidly alter the path a voice connection takes through either the PSTN or the MSDN.

As a result of the architecture used, the system may be able to provide higher quality audio encoding, referred to as Enhanced Packet Voice. In conventional system architectures, it is not always possible to provide Enhanced Packet Voice due to the difficulty in providing increased transport bandwidth between the voice coder and packetizer, which may be in physically distinct and geographically dispersed equipment. Since the architecture in this embodiment of the invention utilizes a voice coder 24 and a packetizer 46 on the same card, Enhanced Packet Voice may be implemented.

Enhanced Packet voice is achieved by providing an alternate, higher quality coding function in the Voice Engine 24 and in the VoIP/VoATM Engine 46, optionally coupled with a capability to code audio frequencies outside the conventional 300 to 3,400 Hz bandwidth of toll quality voice. Alternatively, it may also be implemented in the corresponding components at the CPE 62.

Enhanced Packet Voice is useful in applications such as audio conferencing and echo cancellation, where the nonlinearity of conventional $\mu$-law or A-law code results in a reduced effectiveness of those algorithms processing the coded voice or voice band signal. Examples of alternate coders for the Voice Engine are 16-bit linear coders, coders with a higher than usual sampling rate, and coders that are both 16-bit linear coders and have a higher sampling rate. The reduction of effectiveness is typically, although not exclusively, due to nonlinear coding yielding a reduced quality of coding of a desired signal when a stronger, undesired signal is present.

Examples of alternate coders for the VoIP/VoATM Engine include perceptual coders defined for studio or CD quality audio. An alternate, higher quality coder generally results in a higher packet/cell rate from the VoIP/VoATM Engine.

Although the invention has been described with reference to certain specific embodiments, various modifications thereof will be apparent to those skilled in the art without departing from the spirit and scope of the invention as outlined in the claims appended hereto.

What is claimed is:

1. A voice and data communication system comprising a customer premises equipment (CPE) element and a line card for transferring communication signals between a subscriber and a network, said line card comprising:
   a broadband analog front end for coupling said line card to said CPE through a transmission medium;
   a digitizer for digitizing received voice signals;
   a packetizer for packetizing said digitized voice signals, wherein said packetizer performs at least one of voice over internet protocol (VoIP) and voice over asynchronous transfer mode (VoATM) packetization;
   a modem for transmitting voice and data packets to said CPE; and
   a system interface for coupling said line card to at least one network;
   wherein said line card digitizes and packetizes said voice signals upon failure of said CPE, wherein said CPE comprises:
   a digitizer for digitizing received voice signals;
   a packetizer for packetizing said digitized voice signals, wherein said packetizer performs at least one of voice over internet protocol (VoIP) and voice over asynchronous transfer mode (VoATM) packetization;
   a modem for transmitting voice packets; and
   a switch for bypassing said packetizing system to a Plain Old Telephone System (POTS) terminal, wherein said switch is a relay for switching between said packetizer and said POTS system, wherein the position of said switch is determined by a signal, said signal indicating the status of the connection between said CPE, and said line card.

2. A voice and data communication system comprising a customer premises equipment (CPE) element and a line card for transferring communication signals between a subscriber and a network, said line card comprising:
   a broadband analog front end for coupling said line card to said CPE through a transmission medium;
   a digitizer for digitizing received voice signals;
   a packetizer for packetizing said digitized voice signals, wherein said packetizer performs at least one of voice over internet protocol (VoIP) and voice over asynchronous transfer mode (VoATM) packetization;
   a modem for transmitting voice and data packets to said CPE; and
   a system interface for coupling said line card to at least one network;
   wherein said line card digitizes and packetizes said voice signals upon failure of said CPE, wherein said CPE comprises:
   a digitizer for digitizing received voice signals;
   a packetizer for packetizing said digitized voice signals, wherein said packetizer performs at least one of voice over internet protocol (VoIP) and voice over asynchronous transfer mode (VoATM) packetization;
   a modem for transmitting voice packets; and
   a switch for bypassing said packetizing system to a Plain Old Telephone System (POTS) terminal, wherein said line card packetizes said voice signals upon failure of said CPE to do so, and wherein digitizing and packetizing equipment of said CPE is bypassed.

3. A voice and data communication system comprising a customer premises equipment (CPE) element and a line card for transferring communication signals between a subscriber and a network, said line card comprising:
   a broadband analog front end for coupling said line card to said CPE through a transmission medium;
   a digitizer for digitizing received voice signals;
   a packetizer for packetizing said digitized voice signals, wherein said packetizer performs at least one of voice over internet protocol (VoIP) and voice over asynchronous transfer mode (VoATM) packetization;
   a modem for transmitting voice and data packets to said CPE; and
   a system interface for coupling said line card to at least one network;
   wherein said line card digitizes and packetizes said voice signals upon failure of said CPE, wherein said CPE comprises:
   a digitizer for digitizing received voice signals;
   a packetizer for packetizing said digitized voice signals, wherein said packetizer performs at least one of voice over internet protocol (Vol P) and voice over asynchronous transfer mode (VoATM) packetization;
   a modem for transmitting voice packets; and
   a switch for bypassing said packetizing system to a Plain Old Telephone System (POTS) terminal, wherein said failure is a power failure at said subscriber's location.

4. A voice and data communication system comprising a customer premises equipment (CPE) element and a line card for transferring communication signals between a subscriber and a network, said line card comprising:
   a broadband analog front end for coupling said line card to said CPE through a transmission medium;
   a digitizer for digitizing received voice signals;
   a packetizer for packetizing said digitized voice signals, wherein said packetizer performs at least one of voice over internet protocol (VoIP) and voice over asynchronous transfer mode (VoATM) packetization;
   a modem for transmitting voice packets to said CPE; and
   a system interface for coupling said line card to at least one network;
   wherein said line card digitizes and packetizes said voice signals upon failure of said CPE, wherein said CPE comprises:
   a digitizer for digitizing received voice signals;
   a packetizer for packetizing said digitized voice signals, wherein said packetizer performs at least one of voice over internet protocol (VoIP) and voice over asynchronous transfer mode (VoATM) packetization;
a modem for transmitting voice packets; and
a switch for bypassing said packetizing system to a Plain Old Telephone System (POTS) terminal, wherein said failure is inability to synchronize a DSL modem on said CPE with a DSL modem on said line card.

5. A voice and data communication system comprising a customer premises equipment (CPE) element and a line card for transferring communication signals between a subscriber and a network, said line card comprising:
a broadband analog front end for coupling said line card to said CPE through a transmission medium;
a digitizer for digitizing received voice signals;
a packetizer for packetizing said digitized voice signals, wherein said packetizer performs at least one of voice over internet protocol (VoIP) and voice over asynchronous transfer mode (VoATM) packetization;
a modem for transmitting voice and data packets to said CPE; and
a system interface for coupling said line card to at least one network;
wherein said line card digitizes and packetizes said voice signals upon failure of said CPE, wherein said CPE comprises:
a digitizer for digitizing received voice signals;
a packetizer for packetizing said digitized voice signals, wherein said packetizer performs at least one of voice over internet protocol (Vol P) and voice over asynchronous transfer mode (VoATM) packetization;
a modem for transmitting voice packets; and
a switch for bypassing said packetizing system to a Plain Old Telephone System (POTS) terminal, wherein said digitizers provide enhanced packet voice audio encoding.

6. A voice and data communication system comprising a customer premises equipment (CPE) element and a line card for transferring communication signals between a subscriber and a network, said line card comprising:
a broadband analog front end for coupling said line card to said CPE through a transmission medium;
a digitizer for digitizing received voice signals;
a packetizer for packetizing said digitized voice signals, wherein said packetizer performs at least one of voice over internet protocol (VoIP) and voice over asynchronous transfer mode (VoATM) packetization;
a modem for transmitting voice and data packets to said CPE; and
a system interface for coupling said line card to at least one network;
wherein said line card digitizes and packetizes said voice signals upon failure of said CPE, wherein said CPE comprises:
a digitizer for digitizing received voice signals;
a packetizer for packetizing said digitized voice signals, wherein said packetizer performs at least one of voice over internet protocol (VoIP) and voice over asynchronous transfer mode (VoATM) packetization;
a modem for transmitting voice packets; and
a switch for bypassing said packetizing system to a Plain Old Telephone System (POTS) terminal, wherein said packetizers provide enhanced packet voice audio encoding.

7. A system for providing a voice signal for transmission comprising a line card for receiving said voice signal from a telephone via a subscriber line, said line card including:
a front end for coupling said line card to said telephone;
a digitizer for digitizing received voice signals;
a packetizer for packetizing said digitized voice signals, wherein said packetizer performs at least one of voice over internet protocol (VoIP) and voice over asynchronous transfer mode (VoATM) packetization; and
a system interface for coupling said line card to a network, wherein said front end corresponds to a broadband analog front end, and wherein said line card further includes:
a modem that transmits said packetized voice signals to said telephone via said broadband analog front end circuit, wherein said telephone comprises:
a second digitizer that digitizes second received voice signals;
a second packetizer that packetizes said second digitized voice signals, wherein said second packetizer performs at least one of said VoIP packetization and said VoATM packetization;
a second modem that transmits said second packetized voice signals to said line card via said subscriber line; and
a switch that selectively bypasses said second digitizer, said second packetizer, and said second modem to a plain old telephone system (POTS) terminal.

8. The system of claim 7, wherein a position of said switch is determined by a signal, and wherein said signal indicates a status of a connection between said telephone and said line card.

9. The system of claim 7, wherein failure of said telephone to packetize said second voice signals results in said line card packetizing said digitized voice signals and said switch bypassing said second packetizer.

10. The system of claim 9, wherein said failure is a power failure at a subscriber location.

11. The system of claim 9, wherein said failure is an inability to synchronize said modem and said second modem.

12. A system for providing a voice signal for transmission comprising a line card for receiving said voice signal from a telephone via a subscriber line, said line card including:
a front end for coupling said line card to said telephone;
a digitizer for digitizing received voice signals;
a packetizer for packetizing said digitized voice signals, wherein said packetizer performs at least one of voice over internet protocol (VoIP) and voice over asynchronous transfer mode (VoATM) packetization; and
a system interface for coupling said line card to a network, wherein said system interface circuit further selectively couples said line card to one of said network and a second network, wherein said line card further comprises:
a merge controller that selectively controls said digitizer, said packetizer and said system interface with a control signal,
wherein a first aspect of said control signal corresponds to said packetized voice signals being sent to said network, and
wherein a second aspect of said control signal corresponds to unpacketized voice signals being sent to said second network, wherein said digitizer and said packetizer are bypassed.

13. The system of claim 12, wherein said network comprises a multi service data network (MSDN), and wherein said first aspect of said control signal corresponds to a packetizing voice mode.

14. The system of claim 12, wherein said second network comprises a public switched telephone network (PSTN), and wherein said second aspect of said control signal corresponds to a plain old telephone system (POTS) mode.

15. An apparatus including an enhanced line card in a telecommunications system, said enhanced line card being a component of a telecommunications access equipment coupling at least one subscriber line to at least one telecommunications network, said enhanced line card comprising:
- a system interface that interfaces said enhanced line card to a first type of telecommunications network and a second type of telecommunications network;
- a packetizer, coupled to said system interface, that converts between packetized and non-packetized communication signals, wherein said packetizer performs at least one of voice over internet protocol (VoIP) and voice over asynchronous transfer mode (VoATM) packetization;
- a digitizer, coupled to said packetizer and said system interface, that converts between digital and analog communication signals;
- a modem, coupled to said system interface, that communicates digital subscriber line (DSL) signals;
- a broadband front end, coupled to said digitizer and said modem, that selectively communicates first communication signals between said digitizer and said at least one subscriber line and second communication signals between said modem and said at least one subscriber line; and
- a merge controller that controls said system interface, said packetizer, said digitizer, and said modem, wherein said merge controller selectively sends a first control signal, a second control signal, and a third control signal,
- wherein said first control signal controls said system interface, said packetizer and said digitizer to process third communication signals between said second type of telecommunications network and a first type of customer premises equipment (CPE),
- wherein said second control signal controls said system interface and said digitizer to process fourth communication signals between said first type of telecommunications network and said first type of CPE, and
- wherein said third control signal controls said system interface and said modem to process fifth communication signals between said second type of telecommunications network and a second type of CPE.

16. The apparatus of claim 15, wherein said first type of telecommunications network comprises a public switched telephone network (PSTN).

17. The apparatus of claim 15, wherein said second type of telecommunications network comprises a multi service data network (MSDN).

18. The apparatus of claim 15, wherein said first control signal corresponds to a packetizing voice mode.

19. The apparatus of claim 15, wherein said second control signal corresponds to a plain old telephone system (POTS) mode.

20. The apparatus of claim 19, wherein said second control signal and said third control signal correspond to a simultaneous DSL/POTS mode.

21. The apparatus of claim 15, wherein said third control signal corresponds to a DSL mode.

22. The apparatus of claim 15, wherein said at least one subscriber line includes at least one analog subscriber line.

23. The apparatus of claim 15, wherein said at least one subscriber line includes at least one digital subscriber line.

24. The apparatus of claim 15, wherein said system interface interfaces said enhanced line card to a public switched telephone network (PSTN) and a multi service data network (MSDN).

25. The apparatus of claim 15, wherein said packetizer comprises one of a voice over internet protocol (VoIP) engine and a voice over asynchronous transfer mode (VoATM) engine.

26. The apparatus of claim 15, wherein said broadband front end communicates plain old telephone system (POTS) signals.

27. The apparatus of claim 15, wherein said broadband front end communicates said DSL signals.

28. The apparatus of claim 15, wherein said broadband front end communicates plain old telephone system (POTS) signals and said DSL signals.

29. The apparatus of claim 15, wherein said digitizer implements one of a -law code and an A-law code.

30. The apparatus of claim 15, wherein said digitizer and said packetizer implement enhanced packet voice communication.

31. The apparatus of claim 15, wherein said modem comprises a DSL modem.

32. The apparatus of claim 15, wherein said merge controller controls said enhanced line card to selectively communicate plain old telephone system (POTS) signals with a POTS subscriber, said DSL signals with a DSL subscriber, packetized voice signals with a packetized voice subscriber, and combined POTS/DSL signals with a combined POTS/DSL subscriber.

33. The apparatus of claim 15, wherein said first type of CPE comprises a conventional telephone terminal.

34. The apparatus of claim 15, wherein said second type of CPE comprises a packetizing CPE.

35. An apparatus including an enhanced line card in a telecommunications system, said enhanced line card being a component of a telecommunications access equipment coupling at least one subscriber line to at least one telecommunications network, said enhanced line card comprising:
- a system interface that interfaces said enhanced line card to a first type of telecommunications network and a second type of telecommunications network;
- a packetizer, coupled to said system interface, that converts between packetized and non-packetized communication signals, wherein said packetizer performs at least one of voice over internet protocol (VoIP) or voice over asynchronous transfer mode (VoATM) packetization;
- a digitizer, coupled to said packetizer and said system interface, that converts between digital and analog communication signals;
- a front end, coupled to said digitizer, that communicates first communication signals between said digitizer and said at least one subscriber line; and
- a merge controller that controls said system interface, said packetizer, and said digitizer, wherein said merge controller selectively sends a first control signal and a second control signal,
- wherein said first control signal controls said system interface, said packetizer and said digitizer to process second communication signals between said second type of telecommunications network and a conventional telephone terminal, and
- wherein said second control signal controls said system interface and said digitizer to process third communication signals between said first type of telecommunications network and said conventional telephone terminal.

36. The apparatus of claim 35, wherein said front end comprises a broadband front end, and wherein said enhanced line card further comprises:
- a modem, coupled between said system interface and said broadband front end, that communicates digital subscriber line (DSL) signals, wherein said broadband front end further selectively communicates fourth communication signals between said modem and said at least one subscriber line, wherein said merge controller further controls said modem and further selectively sends a third control signal, and wherein said third control signal controls said system interface and said modem to process fifth communication signals between said second type of telecommunications network and a packetizing customer premises equipment.

37. The apparatus of claim 35, wherein said first type of telecommunications network comprises a public switched telephone network (PSTN).

38. The apparatus of claim 35, wherein said second type of telecommunications network comprises a multi service data network (MSDN).

39. The apparatus of claim 35, wherein said first control signal corresponds to a packetizing voice mode.

40. The apparatus of claim 35, wherein said second control signal corresponds to a plain old telephone system (POTS) mode.

41. The apparatus of claim 35, wherein said at least one subscriber line includes at least one analog subscriber line.

42. The apparatus of claim 35, wherein said system interface interfaces said enhanced line card to a public switched telephone network (PSTN) and a multi service data network (MSDN).

43. The apparatus of claim 35, wherein said packetizer comprises one of a voice over internet protocol (VoIP) engine and a voice over asynchronous transfer mode (VoATM) engine.

44. The apparatus of claim 35, wherein said front end communicates plain old telephone system (POTS) signals.

45. The apparatus of claim 35, wherein said digitizer implements one of a -law code and an A-law code.

46. The apparatus of claim 35, wherein said digitizer and said packetizer implement enhanced packet voice communication.

* * * * *